(No Model.) 3 Sheets—Sheet 1.
W. H. MILLER & B. W. LALLY.
MEANS FOR WELDING FLUE PIPES.
No. 494,642. Patented Apr. 4, 1893.
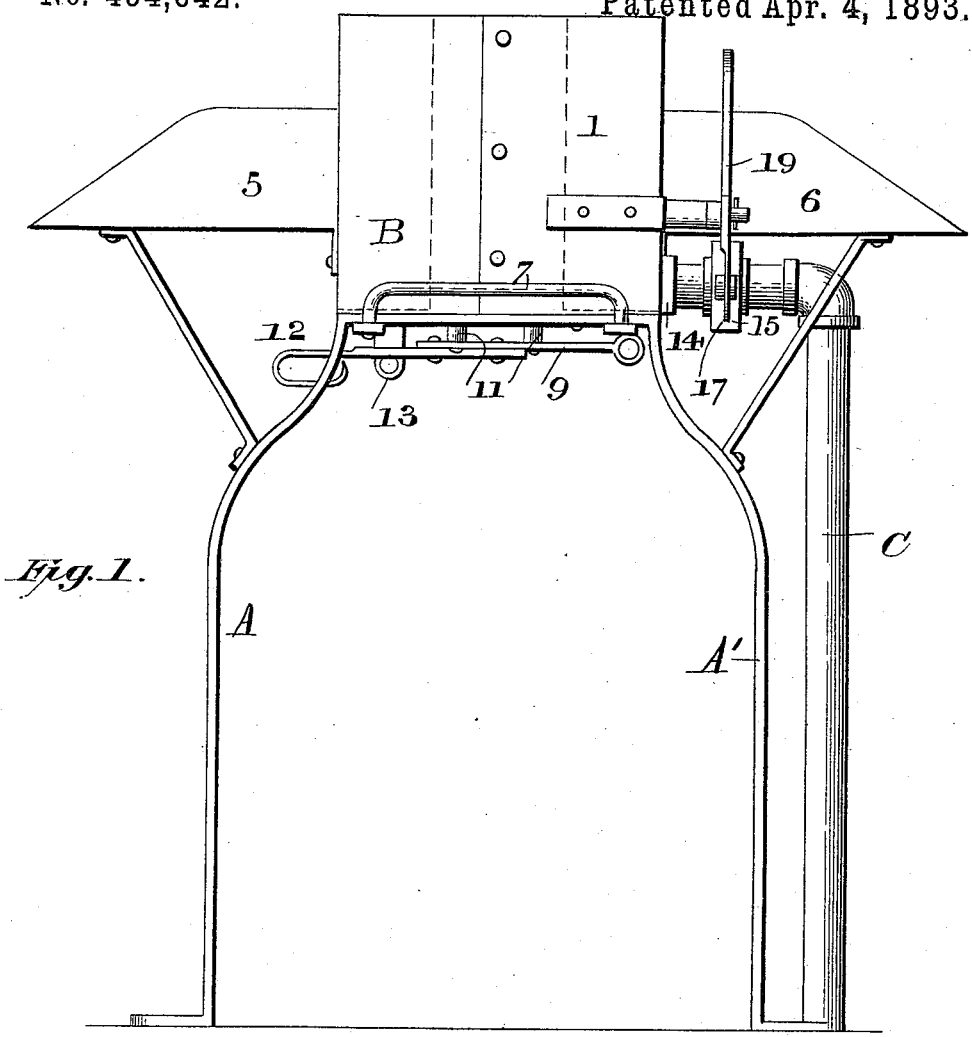
*Fig. 1.*
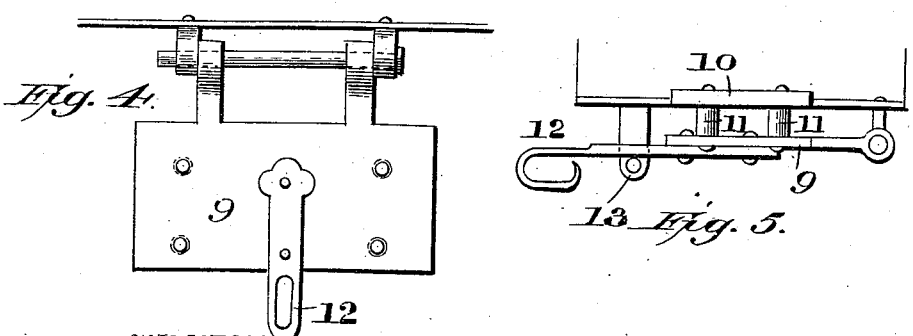
*Fig. 4.*  *Fig. 5.*
WITNESSES
F. L. Ousand
F. M. Phillips
INVENTORS
William H. Miller
Bartholomew W. Lally
by J. M. Yznaga, Attorney

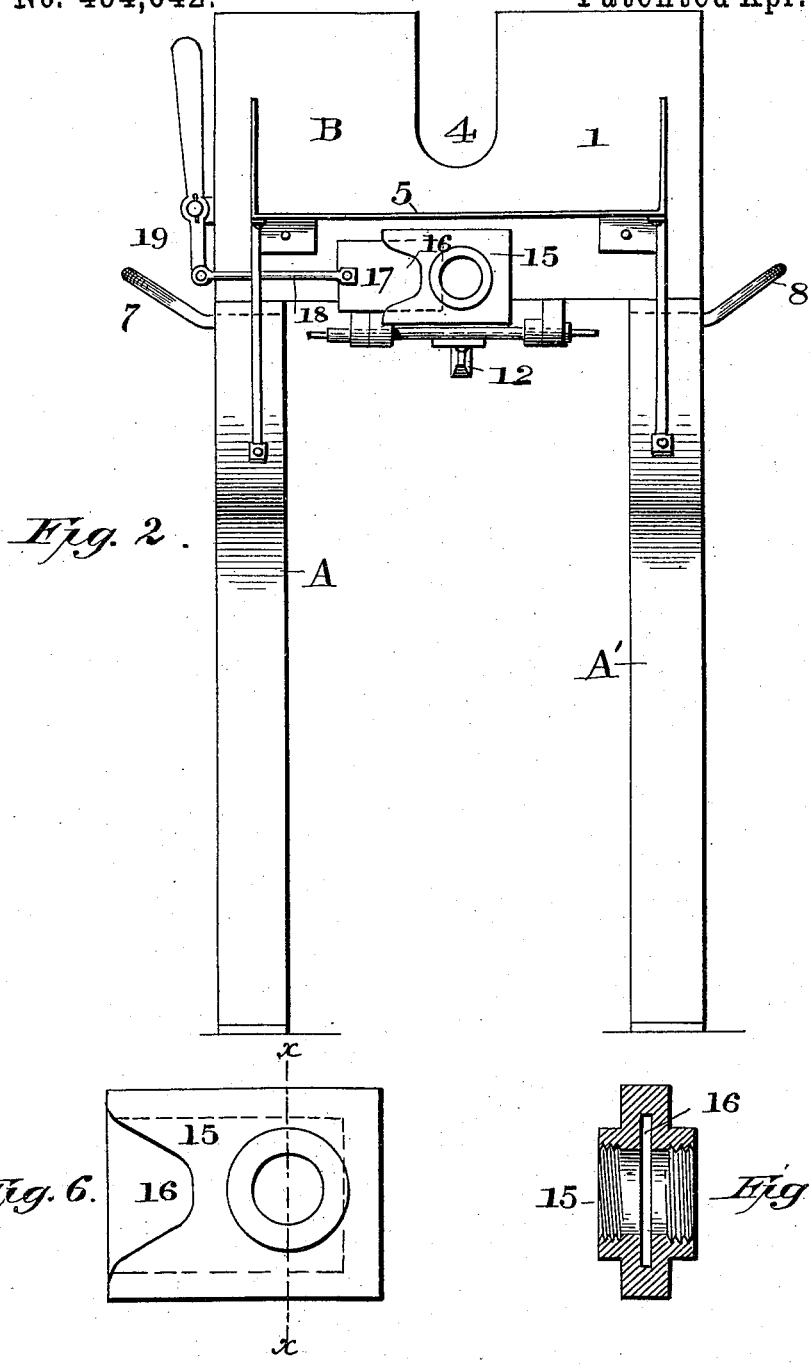
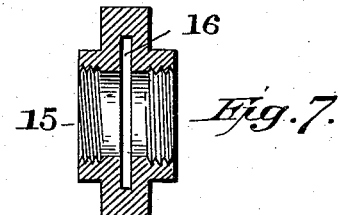

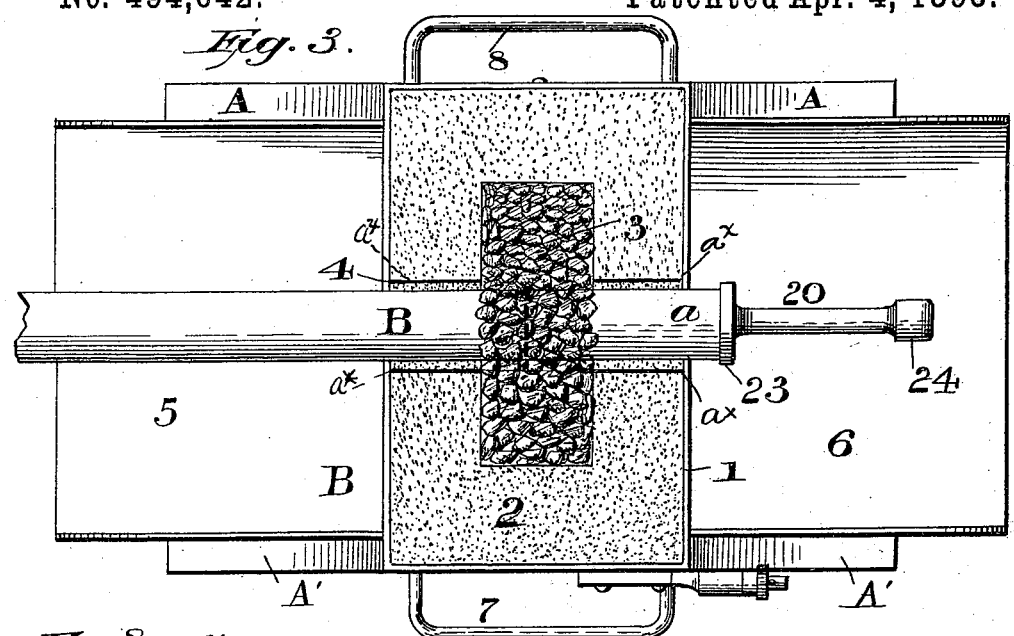

UNITED STATES PATENT OFFICE.

WILLIAM H. MILLER AND BARTHOLOMEW W. LALLY, OF COLUMBUS, OHIO.

MEANS FOR WELDING FLUE-PIPES.

SPECIFICATION forming part of Letters Patent No. 494,642, dated April 4, 1893.

Application filed February 11, 1892. Serial No. 421,169. (No model.)

*To all whom it may concern:*

Be it known that we, WILLIAM H. MILLER and BARTHOLOMEW W. LALLY, citizens of the United States, residing at Columbus, in the county of Franklin and State of Ohio, have invented certain new and useful Improvements in Means for Welding Flue-Pipes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention has relation to improvements in portable forges for welding flues, and the object is to provide improved means for welding flues and pipes.

The invention is hereinafter fully described and particularly pointed out in the claims.

In the accompanying drawings, forming a part of this specification: Figure 1 is a side view of the forge showing the end-supports and blast-pipes. Fig. 2 is an end view showing the blast-pipe valve or damper, and also the pipe-slot in the end piece. Fig. 3 is a plan view of the forge with a flue-pipe resting therein. Fig. 4 is a detail of the ash-door. Fig. 5 is a side view of the same showing the ash-door as closed. Fig. 6 is a detail of the plate for holding the blast-pipe. Fig. 7 is a section of the plate taken on the line $x-x$ of Fig. 6. Fig. 8 is a detail of the blast-pipe valve or damper. Fig. 9 is a section of the same on the line $y-y$ of Fig. 8. Fig. 10 is the welding mandrel with stem to set in the anvil. Fig. 11 is a view of the mandrel for holding the pipe and "safe-end" in position together in the forge to secure the weld.

A, A', designate supports for the forge. These are arranged at the corners of the base of the forge and are four in number.

B designates the fire-box or casing of the forge. This consists of a metal casing 1, having laid therein the hearth 2, in the center of which is the fire-pit 3, as shown in Fig. 3 of the drawings. The hearth may be made of any suitable material, such as fire-clay, soap-stone, &c., laid or molded to suit the purpose. Across the hearth and through the sides of the casing is a trough or channel 4, in which the parts of the flue or pipe are arranged and held when the parts are subjected to the action of the fire. The hearth-lining in the trough which receives the mandrel and tube may be made separate from the other portions of the bed, as indicated by the lines $a^x$ in Fig. 3 of the drawings.

From each end of the forge extend supports 5, 6, to sustain the extending parts of the pipe or flue during the operation of heating. These supports are braced from beneath, as seen in Figs. 1 and 2 of the drawings. Handles 7, 8, are fixed to the sides of the forge by which it may be carried from place to place as desired.

To the bottom of the fire box is hinged a door 9, carrying a plate 10, mounted on studs 11, the plate 10 fitting in the bottom of the forge and closing the fire-pot at its lower end. This door 9 is held closed by a hasp or latch 12, engaging a keeper 13, as shown in Figs. 1 and 5 of the drawings.

In the side of the forge is let in a blast-pipe C, held in a plate 14, secured to the side face of the casing (see Figs. 1 and 6). In the blast-pipe, adjacent to the casing, is arranged a damper or valve piece 15, having a damper-slot 16, in which the damper 17 slides and regulates the blast. This damper is moved by means of a rod 18 and lever 19, as shown in Fig. 2 of the drawings. The blast-pipe leads to the source of the blast which may be of any suitable kind, and for that reason is not shown.

In Fig. 3, are shown pipes or flues arranged in the forge to be welded, disposed with the ends abutting, as indicated in dotted lines, and to hold them in such position in the forge, a mandrel 20, (see Fig. 3,) is passed through the tube into the "safe end" of the flue, as indicated in Fig. 3 of the drawings. The special or particular construction of this mandrel 20 is shown in Fig. 11 as having a cylindrical or round end 21, a bar-handle 22, having an annular collar 23, to limit the insertion of the mandrel in the pipes or flues, and a hand grasp 24, as shown. This mandrel is inserted in the piece $a$, and extends into the safe-end $b$, of the flue, and in this arrangement the parts are subjected to the heating process, as indicated in Fig. 3. After the parts have been heated to the proper degree to effect the union they are withdrawn or the forge is removed, and then the mandrel 20 is withdrawn and the mandrel 25, Fig. 10, inserted, and the parts finished by forging or hammering.

Having thus described our invention, stated its principle, and set forth the mode of operation, we now particularly point out and distinctly specify what we claim—

1. In a portable forge, a fire box or casing having a hearth laid therein, and formed with a pipe-trough 4 in the side-pieces of the same and extending across the hearth and below the top or surface thereof, and a fire-pit in the hearth, substantially as specified.

2. In a portable-forge the fire-box or casing having a hearth laid therein, a fire-pit in the hearth, a pipe-trough formed in the sides of the casing of the fire-box and extending across the hearth below the top thereof, a blast pipe opening into the fire-pit and extended supports 5, 6 at each end of the forge.

3. The portable forge herein described comprising a suitable support, a casing, a hearth and fire-pit in the casing, a pipe-trough formed in the sides of the casing and across the hearth through the fire-pit below the surface of the hearth, and a blast-pipe leading into the fire-pit.

In testimony whereof we affix our signatures in presence of two witnesses.

WILLIAM H. MILLER.
BARTHOLOMEW W. LALLY.

Witnesses to signature of William H. Miller:
A. C. MILLER,
G. H. PEAKS.

Witnesses as to signature of B. W. Lally:
F. F. D. ALBENY,
RICHARD JONES, Jr.